(12) United States Patent
Van Bauwel

(10) Patent No.: US 9,459,824 B2
(45) Date of Patent: Oct. 4, 2016

(54) METHOD AND SYSTEM FOR COMBINING AND PRINTING MULTIPLE PATTERNS ON A CONTINUOUS WEB AND FOR CUTTING SAID PATTERNS THEREFROM

(71) Applicant: Xeikon IP BV, Eede (NL)

(72) Inventor: Jeroen Lucia Jan Maria Van Bauwel, Boechout (BE)

(73) Assignee: Xeikon IP B.V., Eede (NL)

( * ) Notice: Subject to any disclaimer, the term of this patent is extended or adjusted under 35 U.S.C. 154(b) by 0 days.

(21) Appl. No.: 14/018,655

(22) Filed: Sep. 5, 2013

(65) Prior Publication Data

US 2014/0071486 A1 Mar. 13, 2014

(30) Foreign Application Priority Data

Sep. 7, 2012 (EP) ..................................... 12183527

(51) Int. Cl.
*G06F 3/12* (2006.01)
*B41J 11/66* (2006.01)
*B41J 11/70* (2006.01)
*B41J 3/407* (2006.01)

(52) U.S. Cl.
CPC ............ *G06F 3/1296* (2013.01); *B41J 11/663* (2013.01); *B41J 11/70* (2013.01); *B41J 3/4075* (2013.01)

(58) Field of Classification Search
None
See application file for complete search history.

(56) References Cited

U.S. PATENT DOCUMENTS

| | | | | |
|---|---|---|---|---|
| 6,491,361 | B1 * | 12/2002 | Spann | B41J 2/01 219/121.67 |
| 2006/0260741 | A1 * | 11/2006 | Crum | 156/265 |
| 2010/0277767 | A1 * | 11/2010 | Klippenstein | H04N 1/2307 358/1.18 |
| 2012/0033236 | A1 * | 2/2012 | Tsugimura | G06F 3/1206 358/1.2 |
| 2012/0200885 | A1 * | 8/2012 | Matsuzawa | B41J 11/46 358/1.15 |
| 2013/0028648 | A1 * | 1/2013 | Dufort | B41J 11/663 400/621 |

FOREIGN PATENT DOCUMENTS

| | | | | |
|---|---|---|---|---|
| BE | EP 1933257 | A1 * | 6/2008 | ............ B41J 3/4075 |
| EP | 1933257 | A1 * | 6/2008 | |
| EP | 1933257 | B1 | 2/2013 | |

* cited by examiner

*Primary Examiner* — Andrew H Lam
(74) *Attorney, Agent, or Firm* — The Webb Law Firm

(57) ABSTRACT

Disclosed is a method for producing series of cut-out forms from a continuous web. The method includes: receiving a plurality of print jobs, each one of the print jobs defining an image, a cut-out contour, and a desired number of copies; generating a set of printing patterns including images from print jobs, which may be combined to obtain the desired numbers of copies of the print jobs; making the printing patterns available to a printer in a combination to obtain the desired copies of the print jobs; generating a set of cut-out patterns including cut-out contours from print jobs, which may be combined to match the combined printing patterns; making the cut-out patterns available to a cutting device; and instructing the cutting device about the sequence in which the cut-out patterns must be applied to cut cut-out forms according to the cut-out contours.

19 Claims, 2 Drawing Sheets

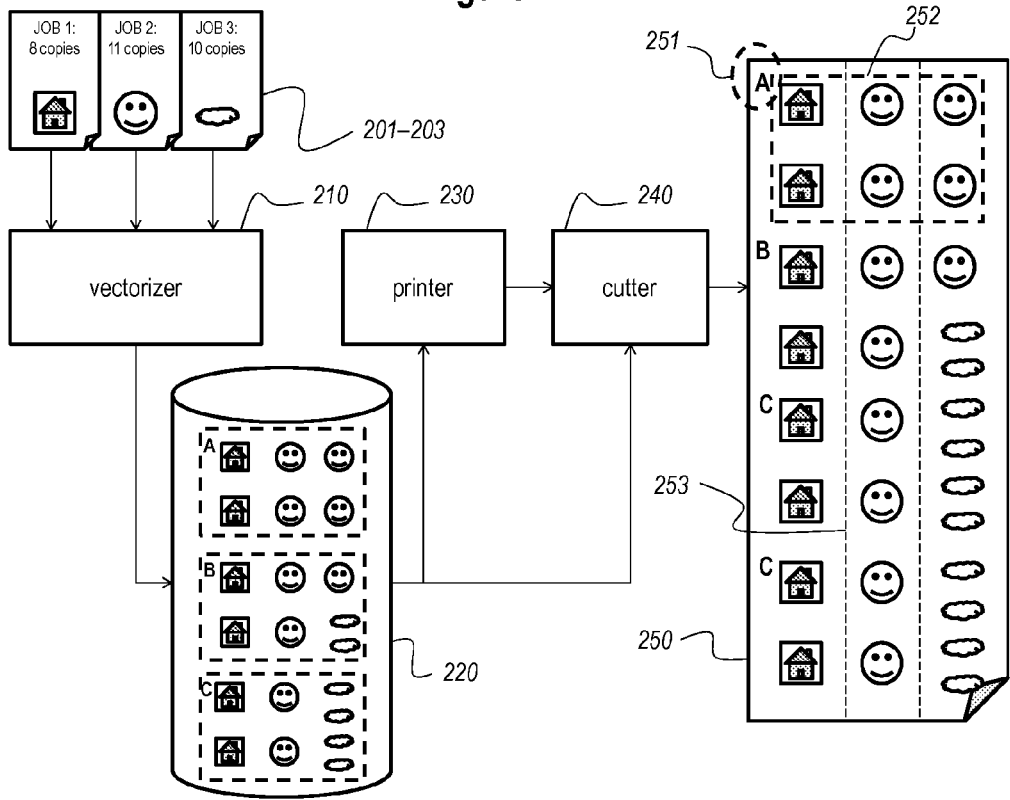
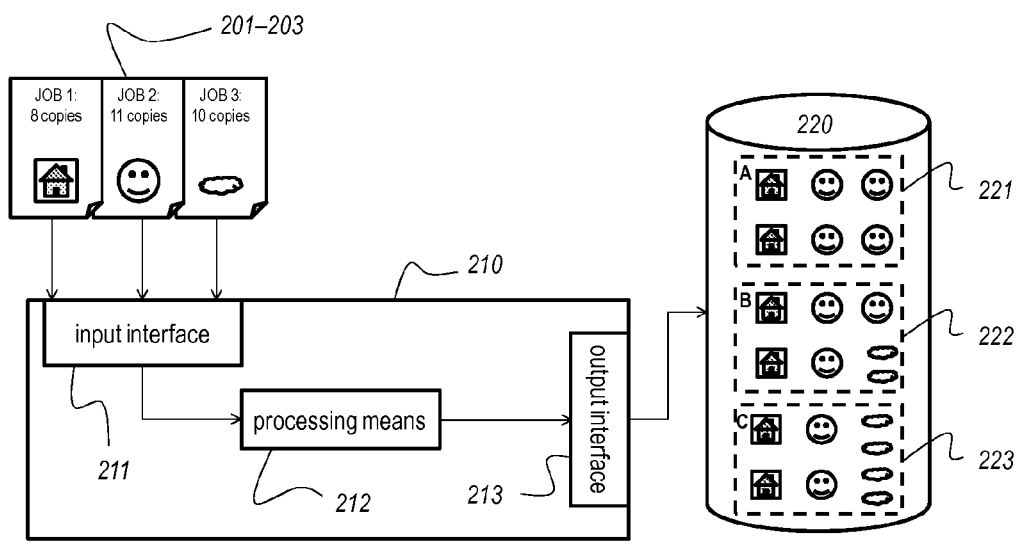

METHOD AND SYSTEM FOR COMBINING AND PRINTING MULTIPLE PATTERNS ON A CONTINUOUS WEB AND FOR CUTTING SAID PATTERNS THEREFROM

CROSS-REFERENCE TO RELATED APPLICATIONS

This application claims priority to European Patent Application No. 12 183 527.6, filed Sep. 7, 2012, the disclosure of which is hereby incorporated by reference in its entirety.

BACKGROUND OF THE INVENTION

1. Field of the Invention

The present invention relates to the field of digital printing systems for so-called "continuous" webs, i.e. printing systems where a continuous roll of substrate (e.g., paper, plastic foil, or a multi-layer combination thereof) is run through the printer, in particular to print large numbers of copies of the same image(s), or alternatively, series of images, or even large sets of individually varying images.

2. Description of Related Art

In conventional printing, an image to be printed is defined on a plate, which is arranged around a cylinder in such a way as to stamp a copy of the image onto the relevant portion of the web upon each revolution of the cylinder. When these continuous webs have to be subjected to a subsequent mechanical cut-out operation (e.g., to cut contours in the top layer of a multi-layer substrate, so as to produce peel-off adhesive labels), it is conventional to also define the cut-out pattern as a plate which repetitively imposes the same cut-out pattern onto the relevant portion of the passing substrate. The same logic is presently being applied to laser cutters, which don't use a physical roll with cutting edges, but which nevertheless use a cutting pattern defined as a single "plate area" which is repeatedly applied.

It is a disadvantage of this method that it is not sufficiently flexible.

SUMMARY OF THE INVENTION

The present invention is based inter alia on the inventive insight of the inventor that digital printing systems, unlike traditional offset printers, are not limited to printing exact copies of the same image. With digital printing system, it is therefore possible to provide webs with an image pattern that is not strictly repetitive, for instance because it includes various images of which different numbers of copies are present on the web. Known cutting systems cannot deal adequately with this situation.

Accordingly, it is an object of embodiments of the present invention to overcome this disadvantage.

According to an aspect of the present invention, there is provided a method for producing series of cut-out forms on a continuous web, the method comprising: receiving a plurality of print jobs, each one of the plurality of print jobs defining an image, a cut-out contour, and a desired number of copies; generating a set of printing patterns comprising one or more images from one or more respective print jobs, which printing patterns may be combined to obtain the respective desired numbers of copies of the print jobs; making the set of printing patterns available to a printer in a combination so as to obtain the respective desired numbers of copies of the print jobs; generating a set of cut-out patterns comprising one or more cut-out contours from one or more respective print jobs, which cut-out patterns may be combined to match the combined printing patterns; making the set of cut-out patterns available to a cutting device; and instructing the cutting device about the sequence in which the cut-out patterns from the set of cut-out patterns must be applied to cut cut-out forms according to the cut-out contours.

In this application, the term "pattern" is used to describe a set of cutting or printing instructions representing one or more images or cut-out contours. The invention is particularly advantageous when used with patterns including at least two images or cut-out contours, and more particularly when the generated set of patterns comprises several distinct patterns.

The imposition of the generated set of patterns onto the substrate in the appropriate order results in the production of the desired number of copies of each of the images.

The invention is based inter alia on the insight of the inventor that a more efficient printing and finishing process can be obtained by driving the die cutter automatically.

It is an advantage of the method according to the present invention that images can be combined on the web in such a way as to obtain the desired number of copies in the most efficient way, for instance by placing the images in parallel longitudinal bands (which may be separated from each other at the end of the printing process) in such a way that a minimal number of bands is produced for each series of images, and that the operation of the cutting-device is automatically controlled to correspond with the chosen image imposition.

Thus, the invention brings digital press technology and laser die cutting devices to the next level, creating new opportunities to further automate label production and increase productivity.

In an embodiment of the method according to the present invention, each one of the cut-out patterns corresponds to one of the printing patterns.

This embodiment is particularly processing and storage efficient, in that it removes the need for a separate set of files to control the printer and the cutting device, respectively.

In an embodiment of the method according to the present invention, the instructing comprises providing a machine readable mark in the printing patterns so as to identify each occurrence of a given cut-out pattern.

It is an advantage of this embodiment that it doesn't require synchronization between the printer and the cutting device.

In an embodiment of the method according to the present invention, the machine readable mark is a bar code.

In another embodiment of the method according to the present invention, the machine readable mark is a 2-dimensional tag, such as a QR-tag.

It is an advantage of these embodiments that reading devices for this type of marks are readily available and relatively simple.

In an embodiment of the method according to the present invention, wherein the making the printing patterns available comprises storing the printing patterns on a storage medium accessible by the printer.

In an embodiment of the method according to the present invention, the making the cut-out patterns available comprises storing the cut-out patterns on a storage medium accessible by the cutting device.

It is an advantage of these embodiments that the entity responsible for generating the printing patterns and/or the cut-out patterns can be used off-line, and need not be active after storing the respective patterns.

In an embodiment, the method according to the present invention further comprises longitudinally cutting the web into a plurality of strips.

In a particular embodiment, the method further comprises transversally cutting the strips into series of identical images.

It is an advantage of these embodiments that allows producing series of labels in a very efficient way, leading to the smallest number of distinct strips (rolls) of labels for the desired set of label images.

According to an aspect of the present invention, there is provided a computer program comprising code means configured to cause a processor to perform the method as described above.

According to an aspect of the present invention, there is provided a vectorizing apparatus comprising: an input interface for receiving a plurality of print jobs, each one of the plurality of print jobs defining an image, a cut-out contour, and a desired number of copies; processing means configured to generate a set of printing patterns comprising one or more images from one or more respective print jobs, which printing patterns may be combined to obtain the respective desired numbers of copies of the print jobs, and to generate a set of cut-out patterns comprising one or more cut-out contours from one or more respective print jobs, which cut-out patterns may be combined to match the combined printing patterns; an output interface for making the set of printing patterns available to a printer in a combination so as to obtain the respective desired numbers of copies of the print jobs and to make the set of cut-out patterns available to a cutting device; and means to instruct the cutting device about the sequence in which the cut-out patterns from the set of cut-out patterns must be applied to cut cut-out forms according to the cut-out contours.

In an embodiment of the apparatus according to the present invention, the means to instruct the cutting device are comprised in the processing means, the processing means being configured to provide a machine readable mark in the printing patterns so as to identify each occurrence of a given cut-out pattern.

According to an aspect of the present invention, there is provided a system for producing series of cut-out forms from a continuous web, the system comprising: a printer, adapted to print printing patterns onto a continuous web; a cutting device, adapted to at least partially cut cutting patterns out of the continuous web; a vectorizing apparatus as described above, operatively connected to the printer and to the cutting device.

In an embodiment, the system according to the present invention further comprises a storage medium accessible by the cutting device, the output interface being operatively connected to the storage medium to allow storage of the cut-out patterns in the form of digital files formatted according to a vector-based format.

In an embodiment of the system according to the present invention, the cutting device comprises an electronically controlled laser device arranged to cut through one or more layers of a multilayer web.

The technical effects and advantages of the embodiments of the computer program, vectorizing apparatus, and system according to the present invention are, mutatis mutandis, the same as those of the corresponding embodiment of the method according to the present invention.

BRIEF DESCRIPTION OF THE DRAWINGS

These and other aspects of the invention will now be described in more detail with reference to the figures, in which:

FIG. 2 presents a schematic illustration of a system according to an embodiment of the present invention; and FIG. 3 presents a more detailed schematic illustration of a vectorizing apparatus according to an embodiment of the present invention.

DESCRIPTION OF THE INVENTION

Figure 1:
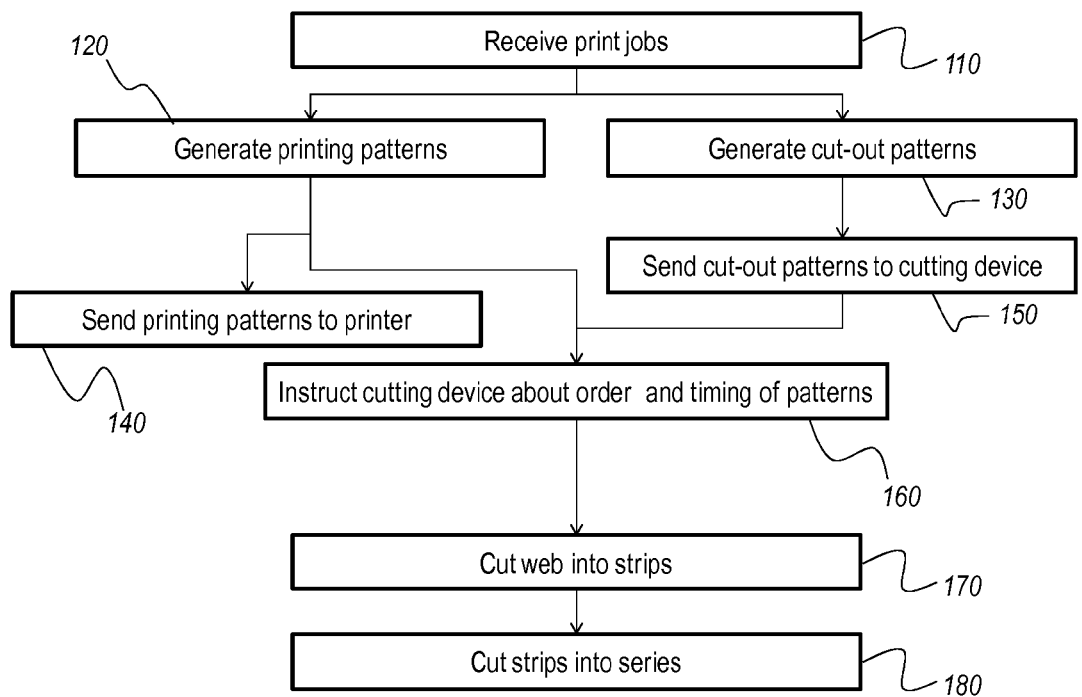
FIG. 1 provides a flow-chart of an embodiment of the method according to an embodiment of the present invention.

Hereinafter, a series of identical or similar images is designated as a number of "copies". It will be understood that these "copies" need not be strictly identical, in the sense that there may for instance be variable serial numbers or batch numbers present in the image (for instance in numerical form or as a machine readable optical pattern). However, the "copies" of a same series are assumed to be subject to the same cut-out contour.

It should be noted that the invention may also be applied in situations where there is no need for multiple copies of the same image, but where the print job consists of a, potentially large, number of individually distinct images or "one-offs".

Throughout this description, the images that have been cut-out in accordance with their predefined cut-out contour are referred to as "cut-out forms" or "labels". The term is understood to include peel-off labels defined by closed contour, i.e. labels produced from a multi-layer substrate, of which a top layer can be peeled off to produce a separate label, preferable an adhesive label. This requires a cutting operation that cuts through the top layer, but not through the lower substrate layer(s). The term may also include shapes defined by a contour consisting of perforations, such that the shapes can easily be pushed out or torn off of the surrounding substrate. The term may also include contours pressed into the substrate to facilitate folding of the latter.

FIG. 1 provides a flow-chart of an embodiment of the method according to an embodiment of the present invention. The method steps are preferably carried out by a vectorizing apparatus, appropriately connected to a printer and cutting device. The vectorizing apparatus may include dedicated hardware or a suitable programmed computer. The printer is preferably a digital printer, in particular an electrophotographic printer, preferably capable of printing on continuous substrates. The cutting device is preferably a cutting device equipped with a laser whose motion is electronically controlled according to cut-out contour. In order to produce peel-off labels, the cutting device is preferably capable of cutting through one or more layers of a multi-layer substrate, while leaving one or more lower layers intact.

In a first step 110, the method comprises receiving a plurality of print jobs, each one of said plurality of print jobs defining an image, a cut-out contour, and a desired number of copies. The print jobs are preferably provided in a standardized file format, such as the Job Definition Format (JDF), which includes both image related data (typically a reference to the files containing the actual images to be printed) and the metadata required for executing the job. The job may alternatively be provided in the Portable Document Format (PDF), which also includes the actual images to be printed. The skilled person will appreciate that other formats are equally suitable. The cut-out contour is preferably provided within the print job file, for instance as a specific layer or (virtual) color within the image to be printed. The cut-out contour is most preferably provided in a vector format—this facilitates driving the cutting device; the image may be provided in a bitmap format or in a vector format.

In a second step 120, the illustrated method comprises generating a set of printing patterns comprising one or more images from one or more respective print jobs. This is done in such a way that the generated printing patterns, when combined, produce the respective desired numbers of copies of the print jobs. When different series of labels are to be produced, the individual series are preferably repeated in parallel longitudinal strips until the desired number of copies is achieved, the remaining length of the strip being used for the next series. This approach ensures convenient separation of the different series after completion of the printing and cutting-out process, by slitting (i.e., longitudinally cutting) the web into strips 170, and then cutting the strips at the series boundaries 180.

The desired pattern of images on the web is preferably divided into one or more regions, i.e. individual printing patterns, having the width of the web and a length that is typically determined by the capabilities of the printer. The imposition of the images onto the web may also be affected by the end customer's requirements, such as a requirement to respect a certain maximum number of copies on a single roll.

If the printer is not capable of printing adjacent regions seamlessly, it is preferable that a single region be used, or that each printing pattern contains an integer number of images, i.e. no image extends across a boundary of printing patterns.

The printing patterns are made available to a printer 140 in a combination so as to obtain the respective desired numbers of copies of the print jobs, as explained above. This "making available" may involve uploading the graphics to be printed as digital data to the printer, or uploading them as one or more files to a storage device to which the printer has access.

In another step, preferably carried out in parallel, a set of cut-out patterns is generated 130, which cut-out patterns comprise one or more cut-out contours from one or more respective print jobs, in such a way that the cut-out, when combined, match the combined printing patterns. Obviously, the cut-out patterns may match the printing patterns in a one-to-one relationship. However, while digital printers may be capable of seamlessly joining parts of an image across adjacent regions, this is typically not the case for cutting devices. Thus, care must preferably be taken that no cut-out contour extends across a boundary of cut-out patterns.

Alternatively, the cut-out patterns may be generated on the basis of the lay-out of the images on the web; in this case, the printing patterns are (virtually) arranged on the web in an additional imposition step, and the cut-out patterns are derived from that lay-out.

The cut-out patterns are made available to a cutting device 150. Again, this "making available" may involve uploading the cut-out contours as digital data to the cutting device, or uploading them as one or more files to a storage device to which the cutting device has access.

Finally, it is important to instruct the cutting device 160 about the sequence in which said cut-out patterns must be applied to cut labels according to the cut-out contours. If the printing process is sufficiently accurately controlled to maintain synchronicity between the printer and the cutting device, this instructing may take place by providing a timed signal to the cutting device. A practical alternative consists of providing each occurrence of a specific cut-out pattern with a specific machine readable optical mark, for instance a bar-code or a 2-dimensional code such as a QR-tag. The mark may include additional information, such a serial number, a batch number, or the like.

The mark is preferably provided in a fixed spatial relationship to the cut-out pattern; it may even consist of several spatially separated parts (for instance including registration marks at corners of the cutting pattern) to facilitate the spatial calibration of the cutting device. The mark does not include cutting instructions, but only a reference to the appropriate cutting pattern for the portion of the web that is presently being processed by the cutting device.

Alternatively, the required sequence of patterns (and its order) may be communicated to the cutting device in advance, thus removing the need to specifically identify the individual cut-out patterns as they appear on the web.

The invention may be implemented as a computer program comprising code means configured to cause a processor to perform the method as described above. In a particular embodiment, the invention is implemented as a software add-on to the digital front-end of a printing system, such as the Xeikon X-800. In that case, the software add-on allows the digital front-end to generate, next to the printable bitmaps, the die cut files that can be used to connect to laser die cutting devices. From JDF or PDF files, preferably generated by a Management Information System (MIS) or Enterprise Resource Planning (ERP) system, the digital front-end (e.g., a Xeikon X-800) creates vector-based files comprising the cut-out patterns (also known as "frames") to drive laser die cutting devices. The files are transferred to the laser die cutting device. Meanwhile, machine-readable marks such as barcodes are printed next to the labels telling the laser die cutting system which of the vector based shapes to use. Because every label can have a different shape, it is particularly advantageous to implement the generation of the cut-out patterns in the digital front-end, which already has access to the information concerning what labels are positioned where on the web.

FIG. 2 presents a schematic illustration of a system according to an embodiment of the present invention.

Without loss of generality, FIG. 2 illustrates the situation in which there are three print jobs. These jobs are exemplary, and their properties are not intended to limit the scope of the invention in any way:

Job 1 consists of 8 copies of a picture of a house;

Job 2 consists of 11 copies of a picture of a smiling face; and

Job 3 consists of 10 copies of a picture of a cloud.

The aforementioned jobs relate to labels, and the job definitions are assumed to include a definition of a cut-out contour.

The illustrated system includes a printer 230, adapted to print printing patterns onto a continuous web 250, a cutting device 240, adapted to at least partially cut cutting patterns out of said continuous web 250, and a vectorizing apparatus 210, operatively connected to said printer 230 and to said cutting device 240. The operation of the vectorizing apparatus 210 is as described above in connection with FIG. 1.

The system may further comprise a storage medium 220, such as a solid-state memory, a magnetic disc, or an optical disc, used in the process of making printing patterns and/or cut-out patterns accessible to the printer 230 or the cutting device 240, respectively. In order to accomplish this, the vectorizing apparatus 210 includes an appropriate output interface 213 to interact with the storage medium 220. The patterns are preferably provided in the form of digital files formatted according to a vector-based format.

In the illustrated example, three different cut-out patterns A, B, C are created, so as to produce the desired number of copies of each image using a minimum number of separate strips or rolls. For the sake of simplicity, the printing patterns are assumed to be identical to the cut-out patterns. These patterns are stored in the storage system 220. It's easy to verify that the sequence of patterns A-B-C-C produces the desired number of copies of the respective images on the web 250.

To facilitate the spatial calibration of the cutter 240, machine readable pattern identification marks 251—illustrated here as the letters A, B, C—may be provided in an appropriate spatial relationship to the occurrence of the corresponding cut-out patterns 252. By reading these marks 251, the cutting device 240 will be informed according to which cutting pattern 252 the presently processed part of the web must be cut.

The illustration also shows the lines 253 along which the printed web may be slitted (i.e., longitudinally cut) in order to obtain strips (rolls) of labels with identical images. The right-most strip may additionally be cut transversally at the boundary between the series of smiling faces and the series of clouds, to obtain two shorter strips (rolls) of labels with identical images FIG. 3 presents a more detailed schematic illustration of a vectorizing apparatus according to an embodiment of the present invention.

The vectorizing apparatus 210 according to the invention comprises an input interface 211 for receiving a plurality of print jobs, each one of which defines an image, a cut-out contour, and a desired number of copies. The vectorizing apparatus 210 further comprises processing means 212 to generate a set of printing patterns comprising one or more images from one or more respective print jobs, which printing patterns may be combined to obtain the respective desired numbers of copies of the print jobs, and to generate a set of cut-out patterns comprising one or more cut-out contours from one or more respective print jobs, which cut-out patterns may be combined to match the combined printing patterns. The vectorizing apparatus 210 further comprises an output interface 213 for making the printing patterns available to a printer 230 in a combination so as to obtain the respective desired numbers of copies of the print jobs 201-203 and to make the cut-out patterns 221-223 available to a cutting device 240. The vectorizing apparatus 210 further comprises means to instruct the cutting device 240 about the sequence in which said cut-out patterns 221-223 must be applied to cut labels according to said cut-out contours.

The term "interface" designates the necessary hardware and software required to establish data communication connectivity across the various layers of the protocol stack, as is well known to a person skilled in the art. Preferably, standardized protocols are used. A LAN interface may for instance include an interface for one or more of an IEEE 802.3 "Ethernet" link, an IEEE 802.11 "Wireless LAN" link. A PAN interface may for instance include a USB interface or a Bluetooth interface.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Although methods and apparatus have been described hereinabove as separate embodiments, this is done for clarity purposes only, and it should be noted that features described only in connection with method embodiments may be applied in the apparatus according to the present invention to obtain the same technical effects and advantages, and vice versa.

The invention claimed is:

1. A method for producing series of cut-out forms from a continuous web, said method comprising:
   a. receiving a plurality of print jobs, each one of said plurality of print jobs defining an image, a cut-out contour, and a desired number of copies;
   b. generating a set of printing patterns comprising one or more images from said plurality of print jobs, wherein a printing pattern of said set of printing patterns comprises a first image of a first print job and a second image of a second print job of said plurality of print jobs, which printing patterns are combinable to obtain the respective desired numbers of copies of said plurality of print jobs, wherein the generated set of printing patterns comprises several distinct printing patterns;
   c. making said set of printing patterns available to a printer in a combination so as to print the respective desired numbers of copies of said plurality of print jobs on said continuous web;
   d. generating a set of cut-out patterns comprising one or more cut-out contours from said plurality of print jobs, wherein a cut-out pattern of said set of cut-out patterns comprises a first cut-out contour of a first print job and a second cut-out contour of a second print job of said plurality of print jobs; which cut-out patterns are combinable to match the combined printing patterns; wherein the generated set of cut-out patterns comprises several distinct cut-out patterns;
   e. making said set of cut-out patterns available to a cutting device;
   f. instructing said cutting device about the sequence in which said cut-out patterns from said set of cut-out patterns must be applied to cut cut-out forms according to said cut-out contours from said continuous web; and
   g. longitudinally slitting the web into a plurality of strips and arranging said plurality of strips on a plurality of rolls.

2. The method according to claim 1, wherein each one of said cut-out patterns corresponds to one of said printing patterns.

3. The method according to claim 2, wherein said instructing comprises providing a machine readable mark in said printing patterns so as to identify each occurrence of a given cut-out pattern.

4. The method according to claim 3, wherein the machine readable mark is a bar code, comprising a reference to said given cut-out pattern.

5. The method according to claim 1, wherein said instructing comprises providing a machine readable mark in said printing patterns so as to identify each occurrence of a given cut-out pattern.

6. A non-transitory computer-readable storage medium storing a computer executable code that causes a computer to perform the method according to claim 5.

7. The method according to claim 1, wherein said making said printing patterns available comprises storing said printing patterns on a storage medium accessible by said printer.

8. The method according to claim 1, wherein said making said cut-out patterns available comprises storing said cut-out patterns on a storage medium accessible by said cutting device.

9. The method according to claim 1, further comprising transversally cutting said strips into series of identical images.

10. A non-transitory computer-readable storage medium storing a computer executable code that causes a computer to perform the method according to claim 1.

11. The method of claim 1, wherein the printing pattern has a length direction extending in a length direction of the continuous web and a width direction extending in a transverse direction of said continuous web, wherein the first image of said printing pattern is adjacent to the second image of said printing pattern seen in said width direction of said printing pattern, wherein the set of printing patterns is made available to a printer in a combination so as to print respective printing patterns of said set of printing patterns, one after the other, on the said continuous web.

12. The method of claim 1, wherein the web is a multi-layer substrate, and wherein the cutting cut-out forms according to the cut-out contours from the continuous web comprises cutting through one or more layers of the web, while leaving one or more other layers of the web intact.

13. The method of claim 1, wherein the cutting cut-out forms according to the cut-out contours from the continuous web comprises cutting cut-out contours consisting of perforations.

14. A system for producing series of cut-out forms from a continuous web, said system comprising:
   a. a printer, adapted to print printing patterns onto a continuous web;
   b. a cutting device, adapted to at least partially cut cutting patterns out of said continuous web, and adapted to longitudinally slit the web into a plurality of strips and to arrange said plurality of strips on a plurality of rolls;
   c. a vectorizing apparatus operatively connected to said printer and to said cutting device, said vectorizing apparatus comprising:
      an input interface for receiving a plurality of print jobs, each one of said plurality of print jobs defining an image, a cut-out contour, and a desired number of copies;
      processing means configured to generate a set of printing patterns comprising one or more images from said plurality of print jobs, wherein a printing pattern of said set of printing patterns comprises a first image of a first print job and a second image of a second print job of said plurality of print jobs, which printing patterns are combinable to obtain the respective desired numbers of copies of said plurality of print jobs, and to generate a set of cut-out patterns comprising one or more cut-out contours from said plurality of print jobs; which cut-out patterns are combinable to match the combined printing patterns; wherein the generated set of printing patterns comprises several distinct printing patterns;
      an output interface for making said set of printing patterns available to a printer in a combination so as to obtain the respective desired numbers of copies of said plurality of print jobs and to make said set of cut-out patterns available to the cutting device; and
      means to instruct said cutting device about the sequence in which said cut-out patterns from said set of cut-out patterns must be applied to cut cut-out forms according to said cut-out contours.

15. The system according to claim 14, further comprising a storage medium accessible by said cutting device, said output interface being operatively connected to said storage medium to allow storage of said cut-out patterns, in the form of digital files formatted according to a vector-based format.

16. The system according to claim 14, wherein said cutting device comprises an electronically controlled laser device arranged to cut through one or more layers of a multilayer web.

17. The system according to claim 15, wherein said means to instruct said cutting device are comprised in said processing means, said processing means being configured to provide a machine readable mark in said printing patterns so as to identify each occurrence of a given cut-out pattern.

18. The system according to claim 17, further comprising a storage medium accessible by said cutting device, said output interface being operatively connected to said storage medium to allow storage of said cut-out patterns, in the form of digital files formatted according to a vector-based format.

19. The system according to claim 17, wherein said cutting device comprises an electronically controlled laser device arranged to cut through one or more layers of a multilayer web.

* * * * *